(12) United States Patent
Jensen et al.

(10) Patent No.: US 6,196,139 B1
(45) Date of Patent: Mar. 6, 2001

(54) WALL SHELF AMUSEMENT DEVICE FOR CATS

(76) Inventors: Stan Jensen; Lynda Janet Marie Wimbush Jensen, both of 2715 Valley View Dr., Reno, NV (US) 89506

(*) Notice: Subject to any disclaimer, the term of this patent is extended or adjusted under 35 U.S.C. 154(b) by 0 days.

(21) Appl. No.: 09/383,076

(22) Filed: Aug. 26, 1999

(51) Int. Cl.⁷ .................................................. A47B 23/00
(52) U.S. Cl. ............................................................ 108/42
(58) Field of Search ............................ 108/42, 47, 161, 108/152; 52/27, 36.4; 211/86, 88, 89, 90, 126.7, 126.14, 128.1, 1, FOR 101, FOR 102, FOR 103, FOR 104, FOR 105

(56) References Cited

U.S. PATENT DOCUMENTS

| | | | |
|---|---|---|---|
| 483,069 | * 9/1892 | Legg | 108/42 |
| 1,984,610 | 12/1934 | Warren . | |
| 2,260,915 | * 10/1941 | Mummery | 108/42 |
| 2,465,635 | * 3/1949 | Conterio | 108/42 |
| 2,472,004 | * 5/1949 | Czerniewicz | 108/42 |
| 2,582,557 | * 1/1952 | Palkman | 108/42 |
| 3,165,368 | * 1/1965 | Hughes et al. | 108/42 X |
| 5,375,802 | * 12/1994 | Branham, II | 52/36.4 X |
| 5,513,575 | * 5/1996 | Slade | 108/42 |
| 5,588,370 | 12/1996 | Longley . | |
| 5,622,010 | * 4/1997 | Weber | 52/36.4 |
| 5,655,740 | 8/1997 | Lazarus . | |
| 5,706,737 | 1/1998 | Whitehead et al. . | |
| 5,711,115 | 1/1998 | Wirt . | |
| 5,755,343 | 5/1998 | Harvey, Sr. . | |

* cited by examiner

Primary Examiner—Jose V. Chen
(74) Attorney, Agent, or Firm—Siemens Patent Services, LC

(57) ABSTRACT

Shelves for assembling climbing apparatus on the walls of a building, for affording exercise and amusement to climbing pets such as cats. Each shelf has a horizontal platform and a vertical depending flange. The platform and flange have common flat rear surfaces. The flange has holes for accepting fasteners for mounting the shelf to the wall. Both the platform and the flange have rounded corners. The platform has a downwardly open, blind threaded hole for receiving a hook or the like, for suspending objects from the shelf. Preferably, the shelves are provided in sets or kits of at least three shelves differently configured from one another. One difference is that of relative widths. Another difference is that one shelf is configured to cooperate with a corner formed by intersecting walls of the building. A method of providing amusement and exercise to a cat comprises the steps of mounting the shelves in spaced apart locations on one or more walls such that a cat can climb the shelves by jumping from shelf to shelf.

7 Claims, 3 Drawing Sheets

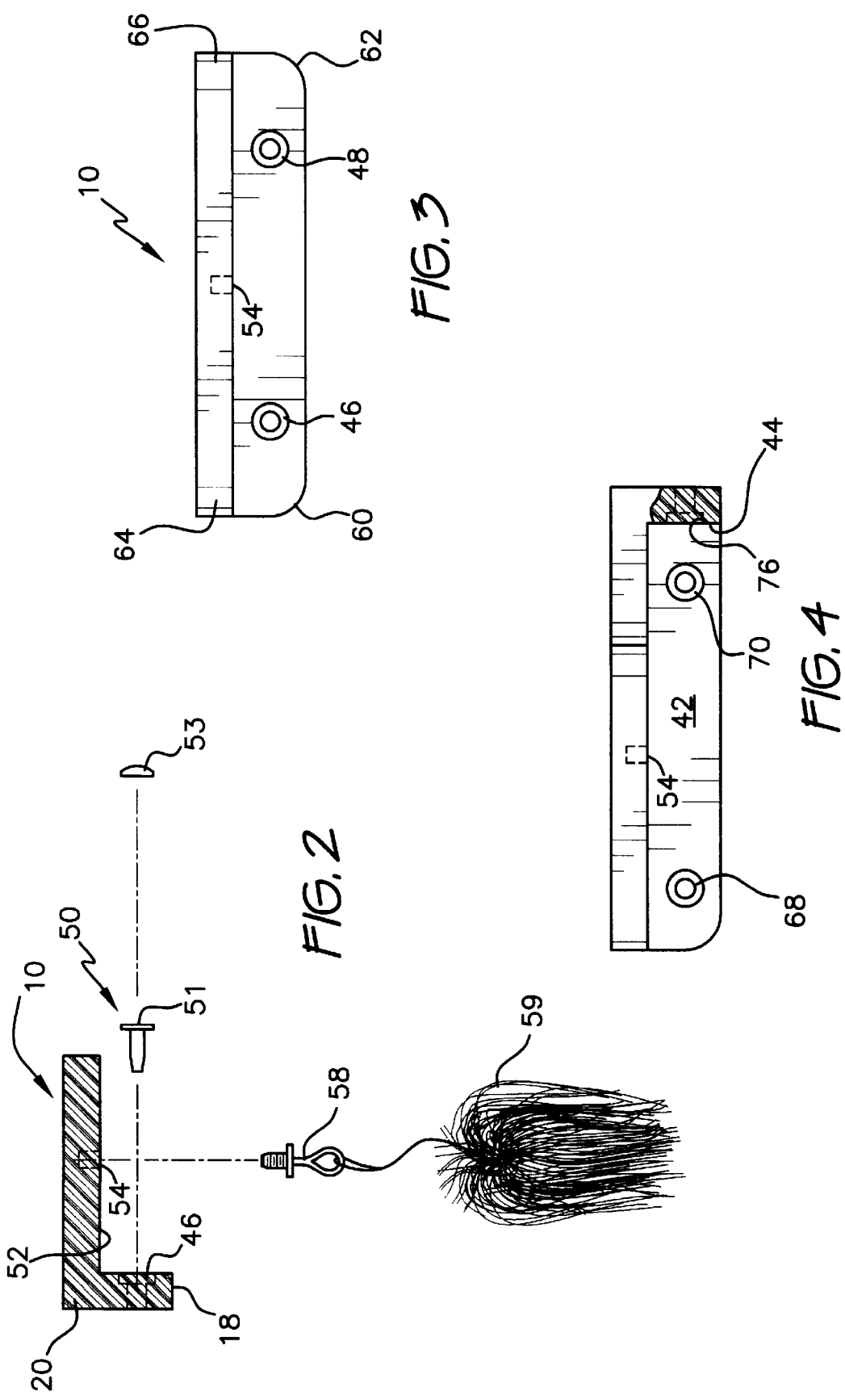

WALL SHELF AMUSEMENT DEVICE FOR CATS

BACKGROUND OF THE INVENTION

1. Field of the Invention

The present invention relates to apparatus which provides shelves or ledges enabling a cat to perch at the side of a wall of a building, for exercise, amusement, and to obtain superior vantage points for viewing. The invention provides a kit or plurality of shelves readily attached to finished walls and partitions of residences and similar buildings, so that a pet cat or other animal inclined to climb can indulge itself in climbing and sitting on the perch afforded by a given shelf. Owners of pets and those desiring to display animals, such as pet store owners, zoo operators, experimenters, and those establishing educational displays can employ the novel kit to build perches usable by cats and other animals.

2. Description of the Prior Art

Cats and other domesticated animals given the run of the residence of their owner frequently enjoy climbing to a vantage point high in the residence or other building where they are kept, for exercise, amusement, and to obtain superior vantage points for viewing. Normally, ordinary furniture, drapes, and other commonplace household objects meet this need. However, such objects are not designed for this type of use, and may become damaged when a pet climbs thereon. Shelves dedicated to pets would answer this need.

Shelves attachable to walls and partitions are known. Shelves adapted for flush mounting on a wall are seen in U.S. Pat. No. 5,706,737, issued to Stephen P. Whitehead et al. on Jan. 13, 1998, and U.S. Pat. No. 5,755,343, issued to Louis A. Harvey, Sr., on May 26, 1998. In each case, the subject patent does not suggest providing a kit of a plurality of related although differently configured shelves, and also does not provide shelves configured in the manner of the present invention.

U.S. Pat. No. 1,984,610, issued to Harlow Warren on Dec. 18, 1934, shows an object suspended from the underside of a shelf. However, the shelf itself lacks a fastener which would cooperate with a corresponding fastener formed in the suspended object. By contrast with Warren, shelves of the present invention have fastening elements for suspending other objects from their undersides.

U.S. Pat. No. 5,588,370, issued to Jonathan T. Longley on Dec. 31, 1996, shows a shelf designed to fit flush against intersecting walls. Longley's shelf is not configured in the manner of a corner shelf of the present invention, lacking a dependent flange, screw holes, and threaded blind holes for suspending an object from the underside of the shelf.

The prior art fails to show a kit or plurality of similarly configured yet different shelves which would be suitable for forming a succession of shelves attachable to a wall or walls to form a staircase for climbing pets.

None of the above inventions and patents, taken either singly or in combination, is seen to describe the instant invention as claimed.

SUMMARY OF THE INVENTION

The present invention sets forth a kit of shelves which are readily installed on one or more walls of a typical residential building, for the purpose of providing recreational facilities for cats and other climbing pets. Three varieties of shelves are provided. One is configured to fit square corners of intersecting walls. Two are configured for flush mounting to a flat wall. The latter two differ in shelf length.

Each shelf has a horizontal support surface and a vertical depending flange for stabilizing the shelf. Mounting holes are formed in the vertical flange. Threaded blind holes are provided in the underside of the horizontal member so that hooks can be removably fixed thereto, for supporting objects such as hanging plant holders.

Preferably, a plurality of shelves are mounted on one or more walls such that they collectively form a stairway. Individual shelves can be spaced apart from one another sufficiently to require that a pet ascend to the highest shelf by jumping from shelf to shelf. Pets, particularly cats, will thus be able to enjoy a modicum of exercise, while also having a vantage point located high in a room so that the pet will be able to view the entire room. A particularly advantageous location for the highest shelf is adjacent a window, so that the pet can observe the outdoors. One shelf is relatively wide or large so that an animal can turn around to descend.

Of course, the same shelves may be employed for storage and display of objects as well as for exercise and amusement of animals. The shelves are configured to have flat surfaces for supporting objects, if desired.

Accordingly, it is one object of the invention to provide indoor climbing apparatus for pets inclined to climb.

It is another object of the invention to provide apparatus for a climbing pet to exercise and to have perches from which it may view the interior of a building.

It is a further object of the invention that the climbing apparatus be readily installed on walls of a building.

Still another object of the invention is to provide a suitable support for removably suspending objects in a room from a wall.

An additional object of the invention is that each shelf be stable after being mounted on a wall or walls.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 2 is an exploded, side elevational, cross sectional, environmental view of one of the shelves of the invention.

FIG. 3 is a front elevational view of the shelf of FIG. 2.

FIG. 4 is a side elevational, cross sectional view of one of the shelves of the invention.

DETAILED DESCRIPTION OF THE PREFERRED EMBODIMENTS

Figure 1:
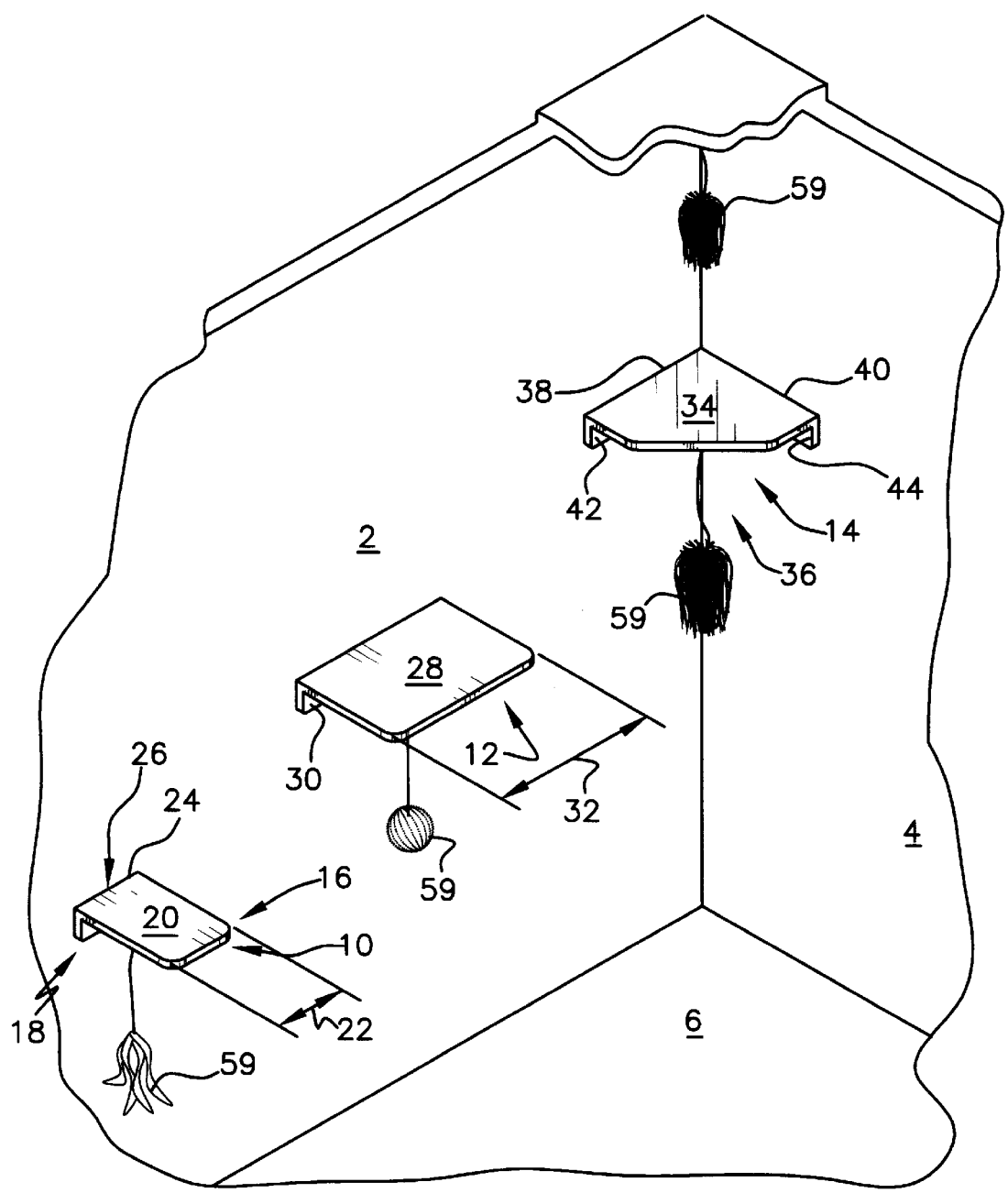
FIG. 1 is an environmental, perspective view of the several shelves of the present invention, illustrating the shelves in a preferred arrangement as they would be installed on the walls of a building.

FIG. 1 of the drawings shows three shelves 10, 12, 14 mounted flush on two flat walls 2, 4 of a building (not shown in its entirety). For the purposes of this invention, "flat" refers to planar nature of surfaces, and not to relation of a surface to a horizontal orientation. Shelves 10, 12, 14 are disposed in a series in spaced apart relation in a progressive order of height. Progressive order of height signifies that any one shelf 10, 12, or 14 is higher than one other adjacent shelf 10, 12, or 14, and lower than another adjacent shelf 10, 12, or 14. A shelf 10 or 14 located at either end of the series of shelves can, of course be adjacent to only one other shelf, when viewed from left to right or from right to left by an observer. Height will be understood to refer to location of a shelf 10, 12, or 14 above the floor 6 of the building.

Shelf 10 has a platform 16 and a flange 18 joined to and depending from platform 16. Platform 16 is characterized in having a flat, planar upper surface 20 having width indicated by arrow 22, and a flat, planar lateral surface 24 disposed perpendicularly to upper surface 20. Flange 18 extends along and continuously spans the entire width 22 of platform 16. Flange 18 has a flat rear surface 26 which is coincident with lateral surface 24 of platform 16.

Shelf 12 has a platform 28 and a depending flange 30 which are generally similar to those of shelf 10, although platform 28 and flange 30 differ,in width, indicated by arrow 32, from the width 22 of shelf 10. Shelf 14 has a platform 34 and a depending flange 36, but differs from shelves 10, 12 in that shelf 14 is configured to be mounted in a corner established at the intersection of walls 2, 4. Both shelves 12, 14 have respective flat upper surfaces corresponding to upper surface 20 of shelf 10.

To accommodate the corner, platform 34 of shelf 14 has perpendicularly arranged lateral surfaces 38, 40. Lateral surfaces 38, 40 are perpendicular both to each other and also to the flat upper surface of platform 34. Flange 36 is formed in two adjacent, intersecting sections 42, 44 disposed perpendicularly to one another, so that shelf 14 will simultaneously contact walls 2 and 4 when mounted in the corner therebetween.

FIGS. 2 and 3 show characteristics of shelf 10. Flange 18 of shelf 10 has two horizontally extending holes 46, 48 passing entirely through flange 18, for accepting fasteners 50. Preferably, holes 46, 48 are stepped holes configured to receive the head 51 of fastener 50. A decorative cap 53 is configured to be frictionally retained within hole 46 (and also within hole 48), to conceal fastener 50. Upper surface 20 has an underside 52 in which are formed a blind threaded hole 54 for accepting a threaded hook 58 or the like. Hook 58 enables objects such as a hanging toy 59 (which may take any of several forms of fabric or other flexible or flaccid material) to be suspended from shelf 10 if desired. A shelf 10, 12, or 14 may be located so that a toy 59 hangs down close to another shelf, so that a cat may play with toy 59.

As seen in FIG. 3, lower corners 60, 62 of flange 18 are rounded. Corresponding forward corners 64, 66 of platform 16 are also rounded. This feature assists in avoiding damage and injury which could result from forceful contact with corners 60, 62, 64, 66, while not substantially reducing strength of either platform 16 or of flange 18.

Strength of shelf 10 is further improved by monolithic construction. This is shown in FIG. 2, wherein it will be seen that shelf 10 is monolithically formed as a single component from a suitable synthetic resin. Shelf 10 thereby avoids joints which would otherwise be present if shelf 10 were fabricated, for example, from two wooden boards joined together. Rather, shelf 10 can be injection molded in a single operation, so that fastener holes 46, 48 and threaded hole 54, do not require separate drilling, tapping, or other steps to be incorporated into shelf 10. Shelves 12 and 14 have similar construction, apart from differences in dimensions and proportions, and in the case of shelf 14, the nature of flange 36.

Turning now to FIG. 4, shelf 14 is seen to have two fastener holes 68, 70 and a downwardly open threaded holes 54 formed in platform 34. Intersecting flange sections 42, 44 are similar having two fastener holes and a downwardly open threaded hole. Only one fastener hole 76 and one threaded hole 54 are visible in the view of FIG. 4.

Figure 5:
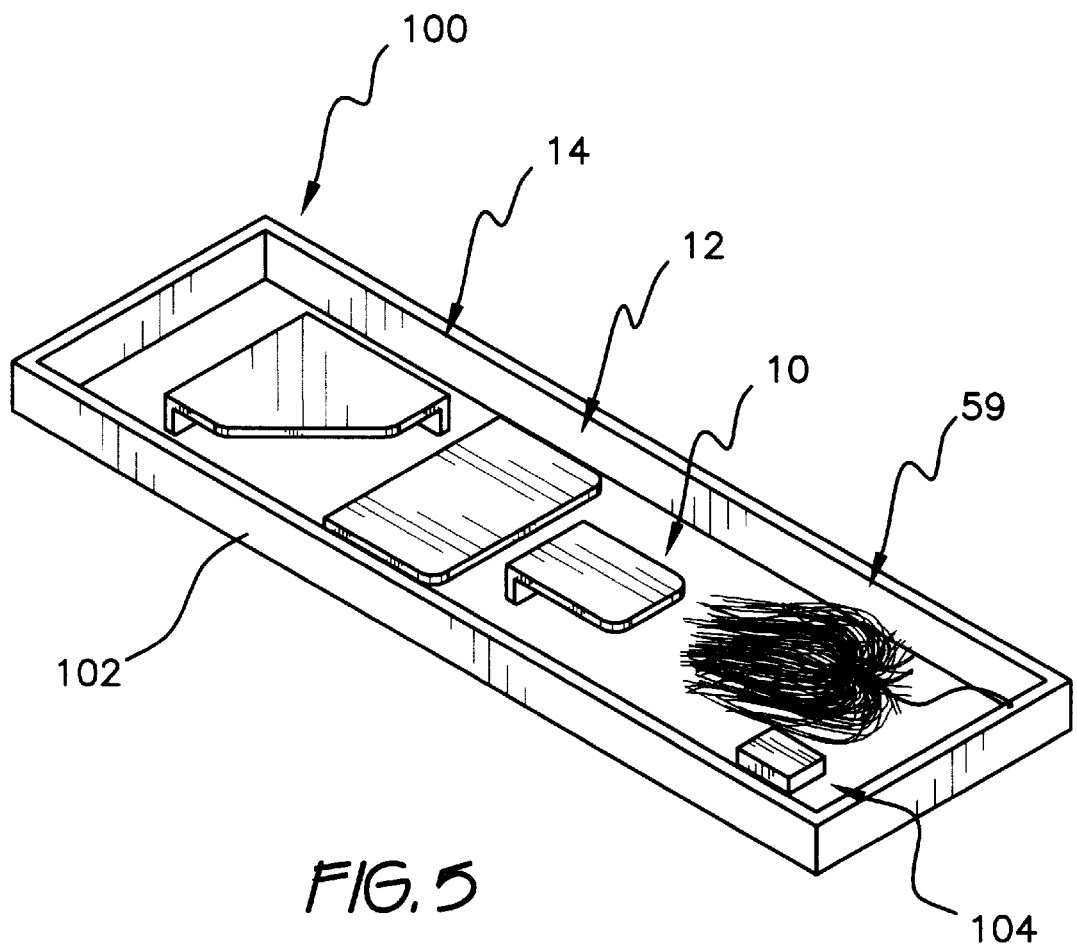
FIG. 5 is a diagrammatic, perspective view of the shelves of the present invention in the form of an enclosed kit.

The invention is preferably provided in the form of a kit 100 of shelves 10, 12, and 14. Kit 100 includes at least of each type of shelf 10, 12, or 14, and is contained within a suitable enclosure 102. Enclosure 102 may be, for example, a corrugated paper carton of the type typically employed for displaying merchandise in retail establishments. Any number of any of shelves 10, 12, or 14 may be included in kit 100. Kit 100 includes printed instructions 104 for assembly. Instructions 104 may be provided as a separate sheet of paper, as shown in FIG. 5, or alternatively may be printed on enclosure 102.

The invention may also be regarded as a method of providing indoor exercise and amusement for a climbing pet inside a building having walls, by employing kit 100. The novel method comprises the steps of mounting a first shelf, such as shelf 10, to wall 2 inside the building, mounting a second shelf, such as shelf 12, to wall 2 in a location spaced apart from the first shelf both horizontally and vertically, and mounting a third shelf, such as shelf 14, to wall 2 in a location spaced apart from both the first shelf and the second shelf both horizontally and vertically. Access to the erected shelves is then provided to a climbing pet.

Full advantage of the invention is taken when one of the steps of assembling or erecting the shelves comprises a further step of locating one of the shelves in a corner formed at the intersection of walls 2, 4. Shelf 14 is located to contact both walls 2, 4 in simultaneous abutment therewith, as shown in FIG. 1. Preferably, shelves 10, 12, 14 are located in a progressive order of height, so that a climbing pet is afforded the highest possible perch with the fewest number of shelves being required.

It is to be understood that the present invention is not limited to the embodiments described above, but encompasses any and all embodiments within the scope of the following claims.

We claim:

1. A kit of shelves for installing a series of spaced apart shelves on a wall of a building, comprising a first shelf having a platform having a flat, planar upper surface having width and a flat, planar lateral surface disposed perpendicularly to said planar upper surface, a flange joined to and depending from said platform, wherein said flange extends along and continuously spans the entire width of said platform, has a flat rear surface which is coincident with said flat, planar lateral surface of said platform, and has horizontally extending holes passing entirely through said flange, for accepting fasteners;

a second shelf having a platform having a flat, planar upper surface having width different from that of said first shelf and a flat, planar lateral surface disposed perpendicularly to said planar upper surface, a flange joined to and depending from said platform, wherein said flange extends along and continuously spans the entire width of said platform, has a flat rear surface which is coincident with said flat, planar lateral surface of said platform, and has horizontally extending holes passing entirely through said flange, for accepting fasteners; and a third shelf having a platform having a flat, planar upper surface having width and a flat, planar lateral surface disposed perpendicularly to said planar upper surface, a flange joined to and depending from said platform, wherein said flange extends along and continuously spans the entire width of said platform, has a flat rear surface which is coincident with said flat, planar lateral surface of said platform, and has horizontally extending holes passing entirely through said flange, for accepting fasteners, and said platform has perpendicularly arranged lateral surfaces for mounting in a corner formed by two intersecting walls, and said depending flange has two adjacent, intersecting sections disposed perpendicularly to one another.

2. The kit of shelves according to claim 1, further comprising an enclosure enclosing said first shelf, said second shelf, and said third shelf together.

3. The kit of shelves according to claim 1, wherein said first shelf has an underside and a blind threaded hole formed in said underside thereof;

said second shelf has an underside and a blind threaded hole formed in said underside thereof; and said third shelf has an underside and a blind threaded hole formed in said underside thereof.

4. A method of providing indoor exercise and amusement for a climbing pet inside a building having walls, comprising the steps of:

mounting a first shelf to a wall inside the building;

mounting a second shelf to a wall inside the building in a location spaced apart from the first shelf both horizontally and vertically;

mounting a third shelf to a wall inside the building in a location spaced apart from both the first shelf and the second shelf both horizontally and vertically;

suspending a first hanging toy made from a flexible material from one of the first, second, and third shelves in a location such that the toy is close to another one of the first, second, and third shelves such that a cat can play with the toy; and providing access to the first, second, and third shelves to a climbing pet.

5. The method according to claim 4, wherein at least one of said steps comprises the further step of locating one of the shelves in a corner formed at the intersection of two walls, and causing the shelf so located to contact both walls in simultaneous abutment therewith.

6. The method according to claim 4 comprising a further step of locating the first shelf, the second shelf, and the third shelf in a progressive order of height.

7. The method according to claim 4, comprising a further step of suspending a second hanging toy made from a flexible material from another one of the first, second, and third shelves in a location such that the second hanging toy is close to another one of the first, second, and third shelves such that a cat can play with the second hanging toy.

* * * * *